F. A. PUTNAM.
TRACTOR.
APPLICATION FILED JAN. 12, 1920.

1,389,010.

Patented Aug. 30, 1921.
2 SHEETS—SHEET 1.

Inventor.
Fred A. Putnam
by Heard Smith & Tennant.
Attys.

F. A. PUTNAM.
TRACTOR.
APPLICATION FILED JAN. 12, 1920.

1,389,010.

Patented Aug. 30, 1921.
2 SHEETS—SHEET 2.

Inventor.
Fred A. Putnam
by Heard Smith & Tennant
Attys

UNITED STATES PATENT OFFICE.

FRED A. PUTNAM, OF KEENE, NEW HAMPSHIRE.

TRACTOR.

1,389,010.   Specification of Letters Patent.   Patented Aug. 30, 1921.

Application filed January 12, 1920. Serial No. 350,832.

*To all whom it may concern:*

Be it known that I, FRED A. PUTNAM, a citizen of the United States, residing at Keene, county of Cheshire, State of New Hampshire, have invented an Improvement in Tractors, of which the following description, in connection with the accompanying drawing, is a specification, like characters on the drawing representing like parts.

This invention relates to tractors and has for its object to provide an improved tractor which will be extremely flexible in its operation, which can be used for traction purposes and also for other power purposes, and which has other advantages, all as will be more fully hereinafter set forth.

In order to give an understanding of my invention, I have illustrated in the drawings a selected embodiment thereof which will now be described, after which the novel features thereof will be pointed out in the appended claims.

In the drawings, Figure 1 is a side view of a tractor embodying my invention

Figure 1:
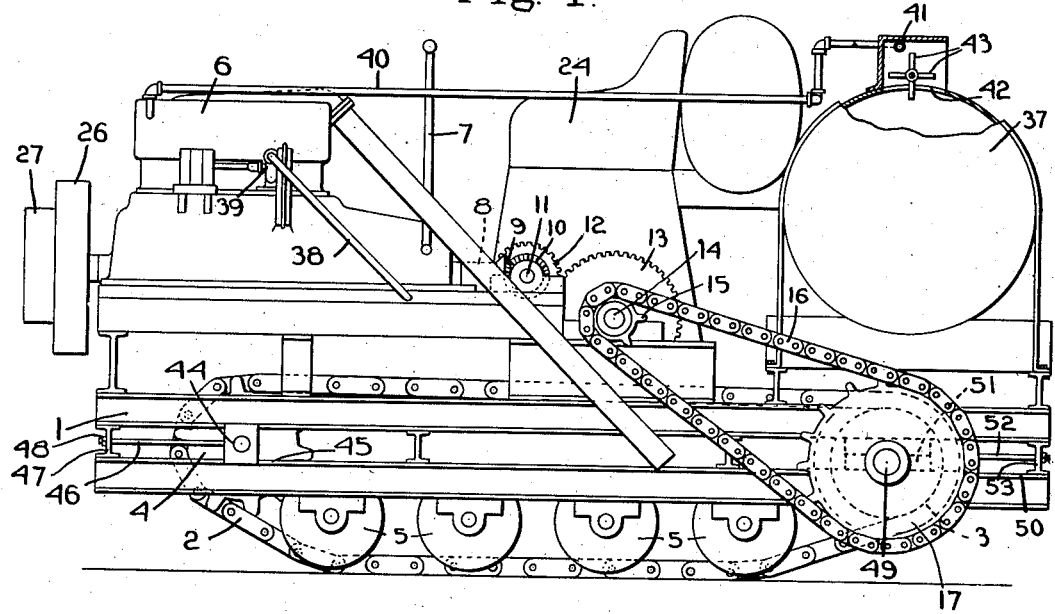

My improved tractor is of that type having two independent traction chains and a motor for operating each chain. The frame of my improved tractor is shown at 1 and the two independent traction chains are indicated at 2. These chains are situated at either side of the frame and may have any suitable or usual construction. Each chain passes around a driving sprocket 3 at the rear of the frame and around an idling sprocket 4 at the front of the frame, and also passes under pressure rolls 5 carried by the frame.

Each traction chain is driven by an independent motor, the two motors for the two chains being indicated generally at 6. These motors are situated directly over the traction chains, and preferably each motor is situated directly over the traction chain to which it is coupled. The motors 6 may have any suitable or usual construction, but I will preferably employ internal combustion engines, although motors of any type might be used without departing from the invention.

There is an independent driving connection between each motor and its traction chain. The character of the driving connections may vary, depending on the type of motor used. In the construction shown, which is the preferred construction, the motors are arranged so that the crank shaft of each motor extends longitudinally of the frame. The type of motor shown is one which includes a controlling lever 7 which controls the usual change gearing, the reverse and the clutch by which the crank shaft of the motor is connected to a driving shaft 8. The driving shaft 8 of each motor has a beveled gear 9 thereon which meshes with a beveled gear 10 journaled on an intermediate shaft 11. Rigid with each gear 10 is a spur gear 12 which meshes with a larger gear 13 on a jack-shaft 14, said jack shaft having a sprocket wheel 15 thereon around which passes a driving sprocket chain 16 that passes around a sprocket 17 rigid with the sprocket 3. The system of gears and sprockets is such as to form a reducing gearing between the driving shaft 8 of the engine and the traction chains. There is a driving connection such as above described between each engine 6 and its traction chain.

Each engine is controlled in usual way by means of a throttle 18, and I have herein provided an accelerator or foot treadle 19 for actuating each throttle. These accelerators may be of any suitable construction. I have herein shown each as comprising a treadle carried by a rock shaft 21 which has an arm 22 extending therefrom that is connected by a link 20 to the throttle, each accelerator being acted on by a return spring 23 to restore the throttle to idling position when the pressure is removed from the accelerator.

The tractor is provided with an operator's seat 24 situated in the rear of the controlling levers 7 and in position so that the operator can operate the two accelerators 19 with his feet. The tractor is steered by accelerating one engine or the other. So long as the two engines run uniformly, the tractor will move in a straight line, but if one engine is speeded up relative to the other, then one of the traction chains will be moved faster than the other and the tractor will be turned. The operator, therefore, can guide the machine merely by controlling the accelerators 19 with his feet. If it is desired to make a sharp turn then the clutch for one engine may be disconnected by means of its lever 7 so as to stop one traction chain while keeping the other moving. If it is desired to make a still sharper turn, one engine may be thrown into reverse, in which case one traction chain will be moved backwardly while the other is moved forwardly. This will result in swinging the tractor about on substantially a pivot centrally of the frame.

Figure 2:
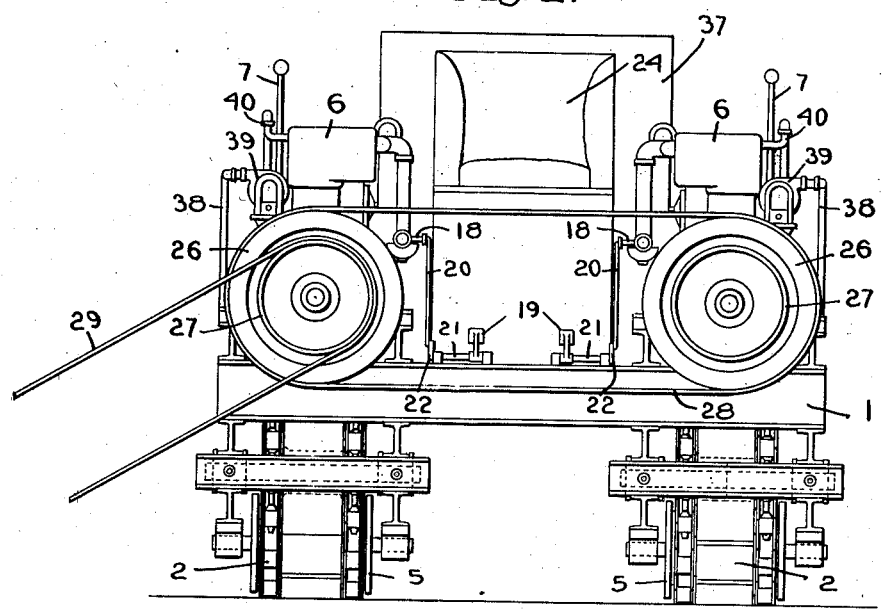
Fig. 2 is a front end view thereof.
Figure 3:
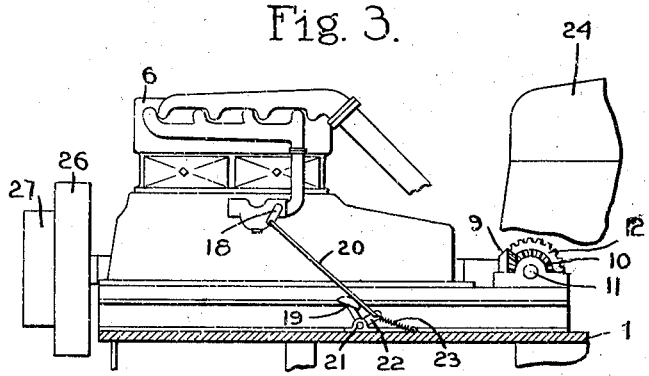
Fig. 3 is a detail showing the manner of controlling each motor
Figure 5:
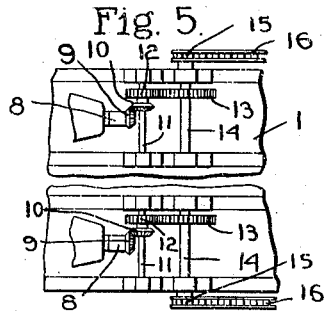
Fig. 5 is a view of the driving gearing between the motors and the tractor chains.
Figure 4:
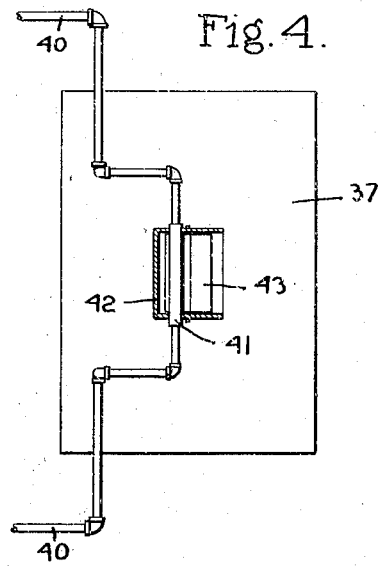
Fig. 4 is a plan view of a portion of the cooling system.
Figure 6:
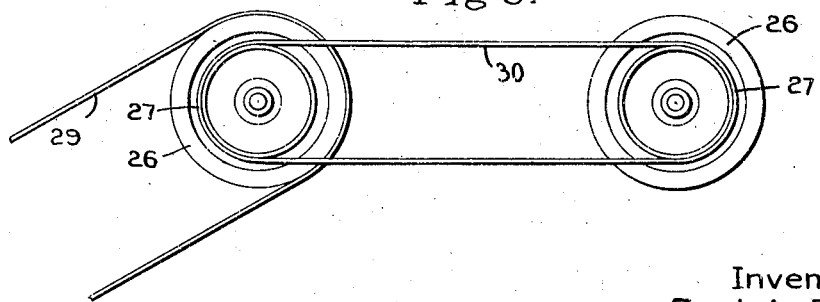
Fig. 6 is a diagrammatic view showing one manner of coupling the two motors.

The engines 6, it will be noted, are situated at the front end of the frame 1 and with their crank shafts extending longitudinally of the frame. Each crank shaft projects beyond the engine frame and the tractor frame and has mounted thereon a fly-wheel element 26 which may also operate as a belt pulley. These fly-wheel elements are situated in front of the tractor frame 1, as clearly shown in Fig. 1, and each fly-wheel element may have associated therewith a belt pulley 27. These fly-wheel elements and belt pulleys constitute one means by which the two engines may be coupled together and both used to operate a machine separate from the tractor. If, for instance, the two fly-wheel elements 26 are connected by the belt 28, as shown in Fig. 2, the two engines will be thus coupled together, and if it is desired to operate a machine outside of the tractor, the clutches for the two engines will be disconnected by means of their levers 7 and then one of the belt pulleys 27 may be connected by a belt 29 to the machine or apparatus which it is desired to operate. Under some circumstances it may be desirable to couple the two engines by a belt 30 which passes around the two belt pulleys 27, as shown in Fig. 6, in which case the outside or separate machine might be driven by a belt 29 passing around one of the fly-wheel elements 26.

Figure 7:
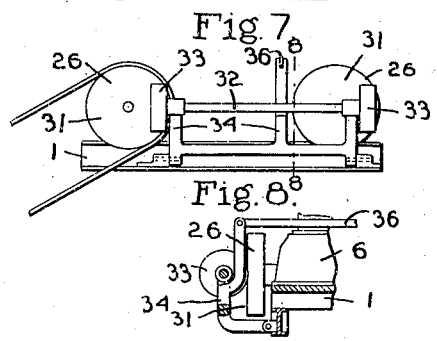
Fig. 7 is a view showing another manner of coupling the motors.
Figure 8:
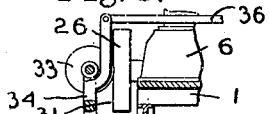
Fig. 8 is a section on line 8—8, Fig. 7.

Another way of coupling the two engines is disclosed in Figs. 7 and 8. In this embodiment the fly-wheel elements 26 are provided with flat faces 31 and they are coupled by means of a shaft 32 having friction wheels 33 thereon which engage the faces 31. This shaft 32 is mounted in a swinging support 34 which is pivoted to the frame so that it can be swung into operative position with the friction wheels 33 engaging the friction faces 31. This support 34 is connected by means of a link 36 to a lever 35 situated where it can be conveniently actuated by the operator on the seat 24.

My improved tractor as above described can thus be used for traction purposes, or it may be used as a power plant for operating any machine such as a saw-mill, threshing machine or the like, by connecting one of the engines to the machine by means of the belt 29. If the machine which is to be operated requires a small amount of power, then one engine only may be used, but if more power is desired, then the two engines can be coupled together, as above described, so that both engines will transmit power to said engine.

Where the motors used are internal combustion engines some cooling system for the engines is, of course, necessary. I have herein illustrated a water tank 37 on the back of the tractor which is connected to the water jacket of the engines through suitable pipe connections 38 each of which has a pump 39 therein operated by the engine so that the pump will cause positive circulation of the water from the pump to the water jackets. From the water jacket of each engine extends a circulating pipe 40 which leads back to the tank 37. I have herein shown the two pipes 40 as connected by a pipe section 41 having apertures therein. This pipe section 41 is situated over an opening 42 formed in the top of the tank 37 so that the water which is delivered from the apertures in the pipe section 41 will be deposited through the opening 42 into the tank 37. Situated beneath the pipe section 41 is a revolving element having a plurality of blades 43 which are arranged so that the water gravitating from the pipe 41 will strike the blades successively and rotate said element. These blades assist in cooling the water.

I have provided herein means for taking up any slack in and tightening both the traction chains 2 and the sprocket chains 16. For taking up slack in the traction chains 2, I have arranged for adjusting the idler sprockets 4. Each idler sprocket is journaled in a bearing 44 which is slidably mounted in ways 45 formed in the frame 1. Each slidable bearing 44 has a screw-threaded rod 46 connected thereto which extends through a cross bar 47 at the front of the frame. Each rod 46 is provided with an adjusting nut 48 which is accessible from the front of the frame. By screwing up the nuts 48 the bearings 44 will be drawn toward the front of the frame thereby tightening the traction chain 2. Each traction chain is provided with its means such as above described for tightening it. Each driving sprocket wheel 17 and corresponding sprocket 3 is mounted on a shaft 49 which is carried in bearings 51 shown in dotted lines Fig. 1 and slidably mounted in ways 50 formed at the rear end of the frame. Each bearing has a screw-threaded rod 52 connected thereto which extends through a cross-bar 53 at the rear of the frame and is provided with a nut. By screwing up the nuts, the bearings 51 will be drawn to the rear, thus tightening the sprocket chain 16. This same action also tends to tighten the traction chain 2. In securing a proper tension for the sprocket chain 16 and traction chain 2 the bearing 51 will first be adjusted to bring the sprocket chain 16 to the proper tension after which the front bearing 44 may be adjusted to bring the traction chain to its proper tension.

While I have illustrated herein some selected embodiments of my invention, I do not wish to be limited to the constructional features shown.

I claim:

1. In a tractor, the combination with a frame, of two independent traction chains, one situated on each side of the frame, two independent motors at the forward end of the frame, one motor being situated directly over each chain and each motor having a longitudinally extending driving shaft, a cross shaft geared to each driving shaft, and a separate driving connection between each cross shaft and one of the traction chains.

2. In a tractor, the combination with a frame, of two independent traction chains, one situated on each side of the frame, two independent internal combustition engines at the forward end of the frame, one engine being situated directly over each traction chain, an independent driving connection between each engine and one of the chains, and means situated between the engines for controlling them independently.

3. In a tractor, the combination with a frame, of two independent traction chains, one situated on each side of the frame, two independent internal combustion engines at the forward end of the frame, each having a crank shaft extending longitudinally of the frame, an independent driving connection between each motor and one of the chains, the crank shaft for each motor extending beyond the front of the frame, and a belt pulley on the projecting end of each crank shaft.

4. In a tractor, the combination with a frame, of two independent traction chains, one situated on each side of the frame, two independent motors situated directly over the traction chains, an independent driving connection between each motor and one of the traction chains, and means for mechanically coupling said motors together.

5. In a tractor, the combination with a frame, of two independent traction chains, one situated on each side of the frame, two independent internal combustion engines, one situated over each traction chain and both situated at the forward end of the frame, an independent driving connection between each engine and one of the chains, an operator's seat in the rear of the engines, and a foot-controlled accelerator for each engine.

6. In a tractor, the combination with a frame, of two independent traction chains, one situated on each side of the frame, two independent internal combustion engines, one situated over each traction chain, a driving sprocket wheel for operating each traction chain, an independent driving connection between each engine and the corresponding driving sprocket, each driving connection including a sprocket chain, means for simultaneously tightening each sprocket chain and the corresponding traction chain.

7. In a tractor, the combination with a frame, of two independent traction chains, a driving sprocket, and an idler sprocket over which each chain passes, an adjustable bearing for each driving sprocket, an adjustable bearing for each idler sprocket, a sprocket wheel rigid with each driving sprocket, a sprocket chain for driving each of the latter sprocket wheels, means for operating said sprocket chain, and means for adjusting each of said adjustable bearings longitudinally of the frame.

In testimony whereof, I have signed my name to this specification.

FRED A. PUTNAM.